United States Patent
Kirtkow et al.

(10) Patent No.: US 8,166,347 B2
(45) Date of Patent: Apr. 24, 2012

(54) AUTOMATIC TESTING FOR DYNAMIC APPLICATIONS

(75) Inventors: Sergej Kirtkow, Hockenheim (DE); Marcos Gavilan De Paz, Neustadt an der Weinstrasse (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 11/362,304

(22) Filed: Feb. 23, 2006

(65) Prior Publication Data

US 2007/0220347 A1 Sep. 20, 2007

(51) Int. Cl.
*G06F 11/00* (2006.01)
(52) U.S. Cl. ........................................................ 714/38
(58) Field of Classification Search .................. 714/338, 714/25
See application file for complete search history.

(56) References Cited

U.S. PATENT DOCUMENTS 7,103,876 B1 * 9/2006 Lopez et al. .................. 717/127
2006/0253742 A1 * 11/2006 Elenburg et al. ................ 714/38

* cited by examiner

*Primary Examiner* — Amine Riad
(74) *Attorney, Agent, or Firm* — Mintz, Levin, Cohn, Ferris, Glovsky and Popeo, P.C.

(57) ABSTRACT

Systems and methods for testing an application having a graphical user interface are disclosed. A function library having a plurality of functions is provided, each function corresponding to a user action within the graphical user interface. User actions within the graphical user interface are developed independent of the operation of the application. A test case comprising one or more functions from the plurality of functions that correspond to the one or more developed user actions is assembled, for later execution to test the application.

18 Claims, 6 Drawing Sheets

FIG. 2

| No. | Name of Call | Result |
|---|---|---|
| 1 | Click_Menu (Click_Menu) | passed |
| | 1. frame     ⊗ : DetailsFrame (SAP Enterprise Portal 7.0 - Microsoft) | |
| | 2. menuName     ∅ : Settings | |
| | 3. location     ∅ : 1 | |
| | △ : This script is not released in TestPartner | |
| | 1 ● 18:17:42: ClickMenu (ClickMenu) | |
| 2 | Click_MenuItem (Click_MenuItem) | passed |
| | 1. frame     ⊗ : DetailsFrame (SAP Enterprise Portal 7.0 - Microsoft) | |
| | 2. item     ∅ : Approval | |
| | △ : This script is not released in TestPartner | |
| | 1 ● 18:17:45: ClickMenu (ClickMenu) | |
| 3 | SetText_TextBox (SetText_TextBox) | failed |
| | 1. frame     ⊗ : DetailsFrame (SAP Enterprise Portal 7.0 - Microsoft) | |
| | 2. location     ∅ : 1 | |
| | 3. text     ∅ : Step4 | |
| | △ : This script is not released in TestPartner | |
| | ■ : 18:21:53: EditBox with location '1' was not found! | |
| | 1 ● 18:21:53: SetText (SetText) | |
| 4 | Click_Button (Click_Button) | failed |
| | 1. frame     ⊗ : DetailsFrame (SAP Enterprise Portal 7.0 - Microsoft) | |
| | 2. buttonName     ∅ : Save Approval Process | |
| | 3. location     ∅ : 1 | |
| | △ : This script is not released in TestPartner | |
| | ■ : 18:22:18: Button 'Save Approval Process' with location '1' was not found! | |

AUTOMATIC TESTING FOR DYNAMIC APPLICATIONS

BACKGROUND

Different tools are presently being used to automatically test graphical user interfaces (UIs). Examples of these tools include WinRunner and TestPartner. These tools provide functionality to record selected user actions within a UI as a script, modify the recorded scripts if necessary, and then automatically replay the user actions according to the scripts. The recorded scripts can only be run separately and they cannot be combined to langer sequences. In order to combine scripts into larger and larger sequences, the scripts have to be divided into smaller scripts only representing the logic of one single action. This is done by developing such scripts using the programming language provided by the test tool.

For dynamic applications, such as SAP's Netweaver suite of applications in which a UI's appearance is dynamically created depending on the user activity (or activity of other users) and where the properties of control elements change frequently, a dynamic adaptation of the recorded scripts is required. For extensive scripts, a large amount of high quality human resources, mostly requiring special programming knowledge, is usually needed to maintain recorded scripts or to re-record certain scripts. Thus, automatic testing of dynamic applications is very resource intense and time consuming.

SUMMARY

This document discloses systems and methods for automatically testing dynamic applications, i.e. applications in which a GUI appearance depends on the user actions or activity within a user interface. In one aspect, a computer-implemented method of testing an application having a graphical user interface includes providing a function library having a set of functions. Each function corresponds to a user action within the graphical user interface. The method further includes developing one or more user actions within the graphical user interface independent of the operation of the application. The method further includes assembling a test case comprising one or more functions from the set of functions that correspond to the one or more developed user actions.

In another aspect, a system for testing an application having a graphical user interface includes a function library. The function library stores a set of functions, each function corresponding to a user action within the graphical user interface. The system further includes a test case formed of a structured set of the set of functions, each of the functions in the structured set of the set of functions corresponds to a user action, the test case being executable by a data processing apparatus to test the application.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 2-6 illustrate various screenshot representations of a test tool in accordance with embodiments.

FIG. 8 illustrates a test case report embodied as a markup language file.

Like reference symbols in the various drawings indicate like elements.

DETAILED DESCRIPTION

This document describes systems and methods for automatically testing dynamic applications. A test case represents a specific use case of an application i.e. creating a folder with a name containing illegal characters, or creating a folder with a name containing special legal characters like "äöü" as used in Germany. A test process, on the other hand, combines several test cases, i.e. the test process "Folder Creation" performs the creation of folders with different criteria, like illegal folder names, different spelling folder names, etc.

Figure 1:
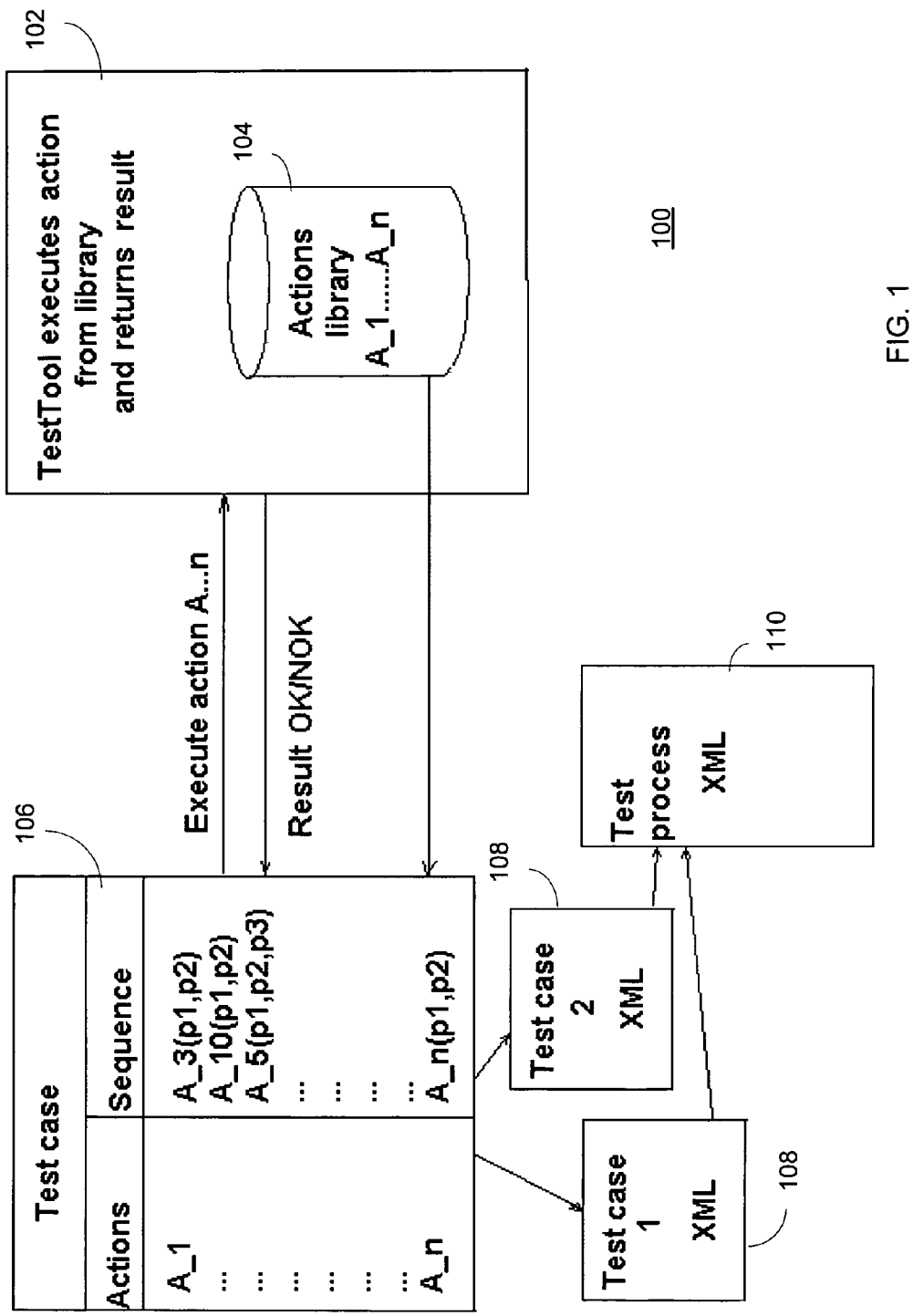
FIG. 1 shows a system for testing an application.

As illustrated in FIG. 1, these systems and methods implement and employ a test tool 102 that includes a UI-specific function library 104 having a number of functions that are independent from any process logic of the UI. Each function in the function library 104 performs only one user action such as "clicking on a link" or "setting the value for a textbox." The functions are executed according to a test case 106 that describes the actions and sequence of test process steps.

As an example, a "Click_Link(<framename>; <linkname>;<location>)" function receives three parameters:

The parameter framename specifies the frame on which the requested link is displayed.

The parameter linkname specifies which link should be clicked. This property is usually unique.

In case the parameter linkname is not unique, the parameter location specifies the link that should be clicked.

Due to these parameters, each function can be used independently of the related UI object. The function library 104 is easy to maintain, as the number of functions is limited to the number of UI control elements of the UI. Each function corresponds to one action. The function library 104 can also include a special developed tracking mechanisms for tracking "bugs" or other errors. The tracking mechanisms is part of any single function.

In some cases, UI control elements are identical for all components (e.g. they all use the HTMLB standard), and the functions are combined into several components by the test tool 102 in a user defined order to cover different scenarios. Test flow information 108 of each test case can be stored as an XML file to decouple the test process logic from the used test tool, and combined into a representative test process 110. In case a new test tool is introduced, the function library 104 only is implemented. The test cases 106 do not need to be recreated, but may be reused with the function library.

The function library 104 may include functions for different UI implementations, e.g. web-based, JAVA, Windows UI, etc. The function library 104 can be extended with special functions suitable for the control elements of each different implementation. Accordingly, the test tool 102 provides an integrated test process where different applications may be tested at the same time, such as when web-based applications call a local windows application, for example.

Creating a test case 106 and test processes 110 requires no detailed programming knowledge. In some embodiments, an internal java application provides a simple UI that allows a user to put together test cases 106 and test processes 110 by simply modeling the test case 106 by combining the user actions (functions) in the desired order with requisite parameter values. This enables a test designer without programming knowledge to easily build up test processes 110 of any complexity. Results of automatically performed tests can be presented as an HTML report with detailed top-down navigation and additional log information for effective error or bug tracking.

Figure 2:
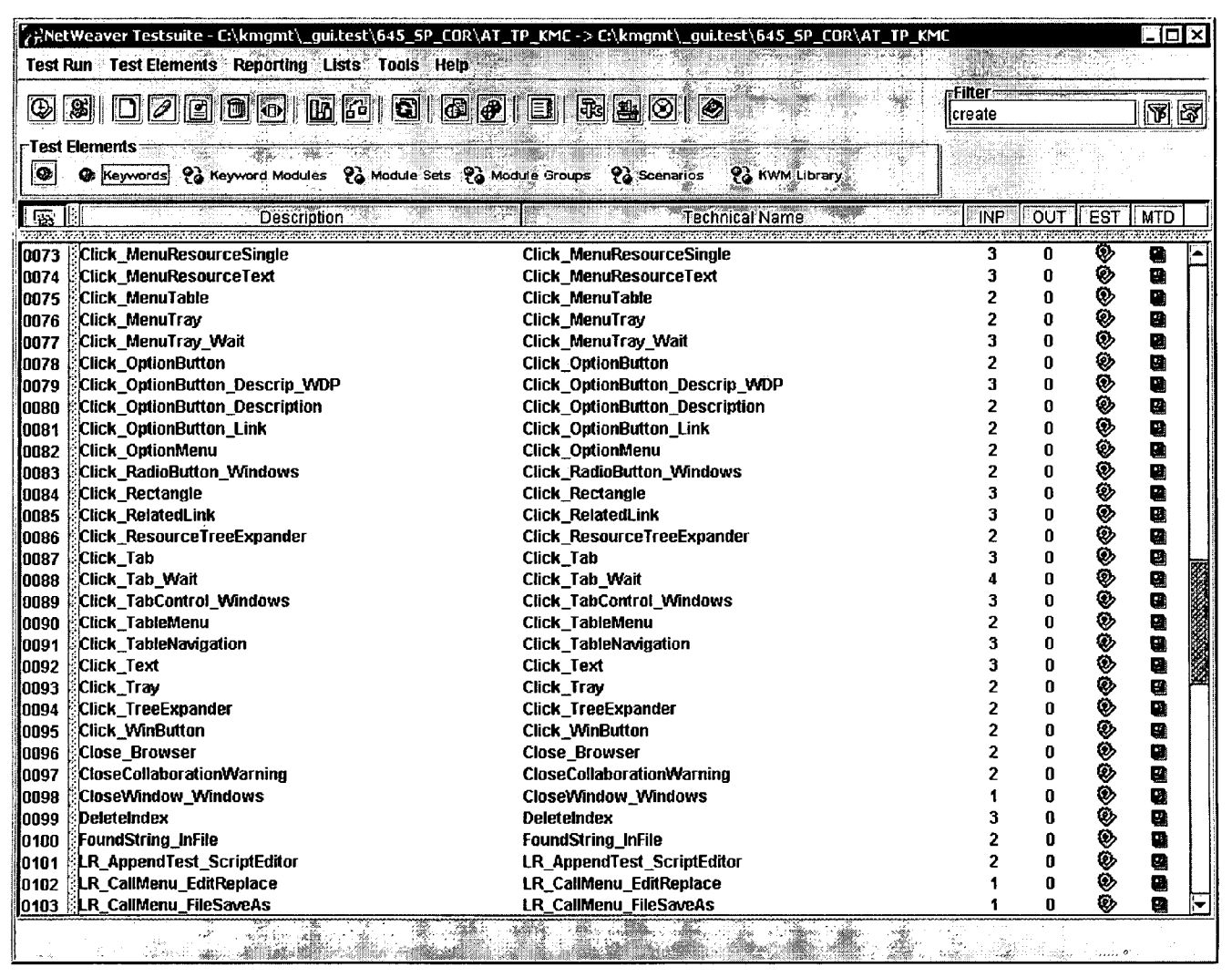
Figure 3:
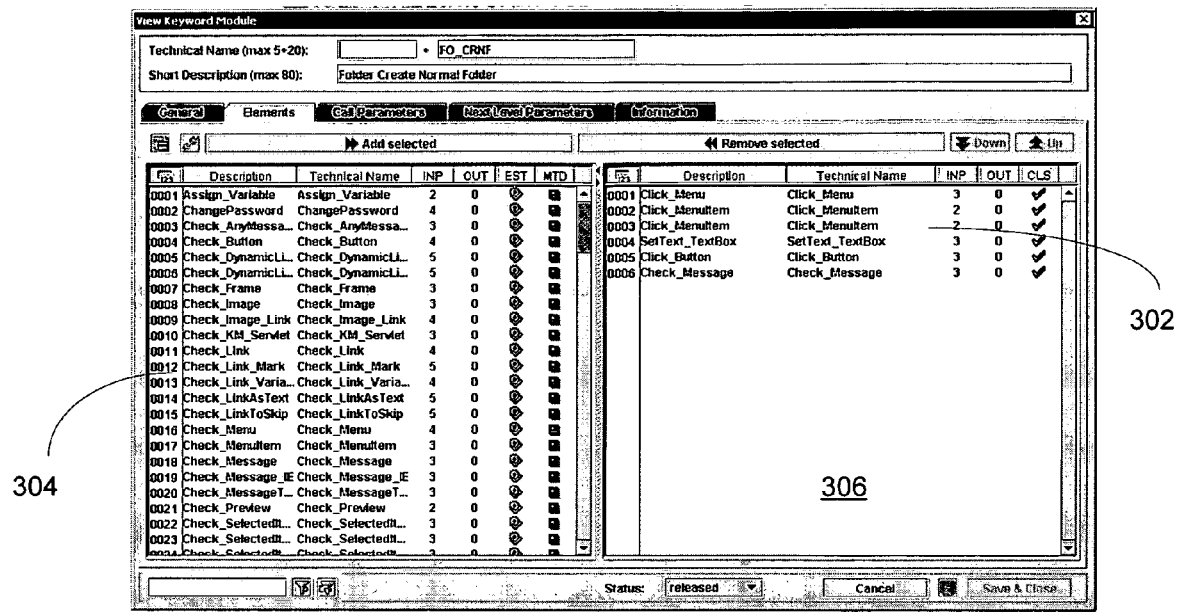
Figure 4:
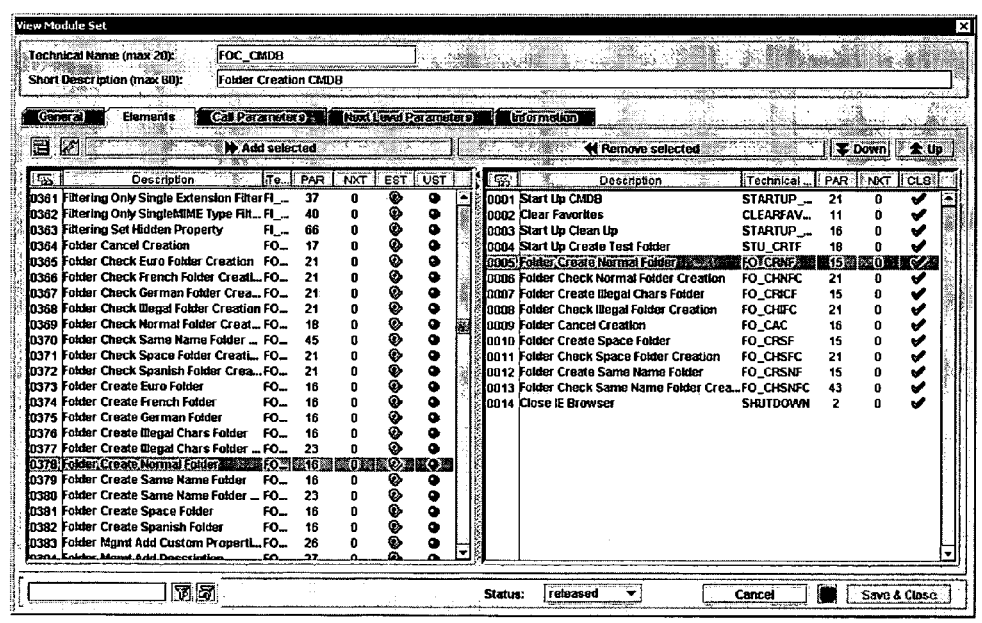
Figure 5:
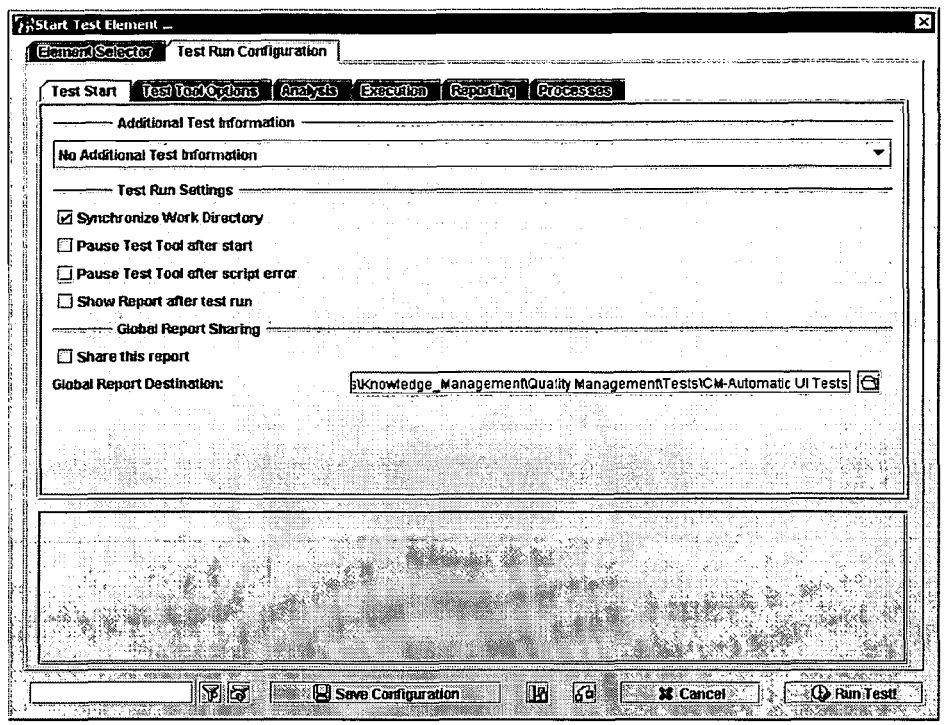
Figure 6:
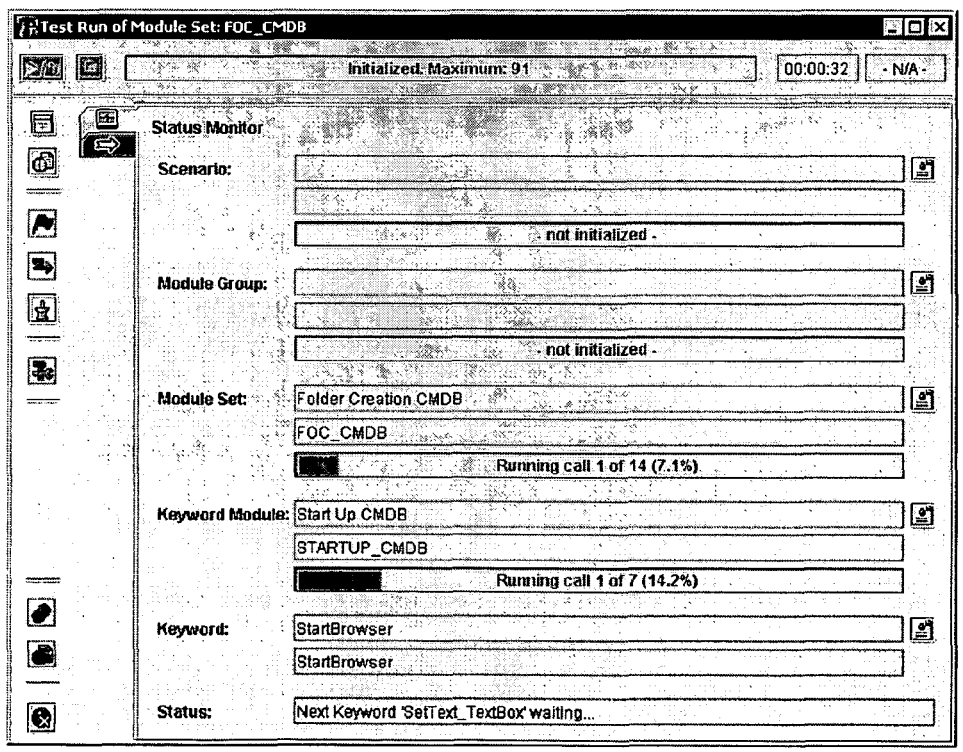

FIG. 2 is a screenshot representation of a test tool UI 200 providing central administration for a test tool as described above. The test tool UI 200 includes a list of test element (i.e. function) descriptions 202, function element names 204, and associated input/output information 204 for each test element. FIG. 3 is a screenshot representation of a test case design UI 300, in which a number of selected test elements 302 are selected from a function library list 304 and arranged into a test case 306. FIG. 4 is a screenshot representation of a test process design UI 400. FIG. 5 is a screenshot representation of a test tool UI 500 via which various start parameters and settings of a test case can be configured to be executed by the test tool. FIG. 6 is a screenshot representation of a run state of a test being conducted.

Figure 7:
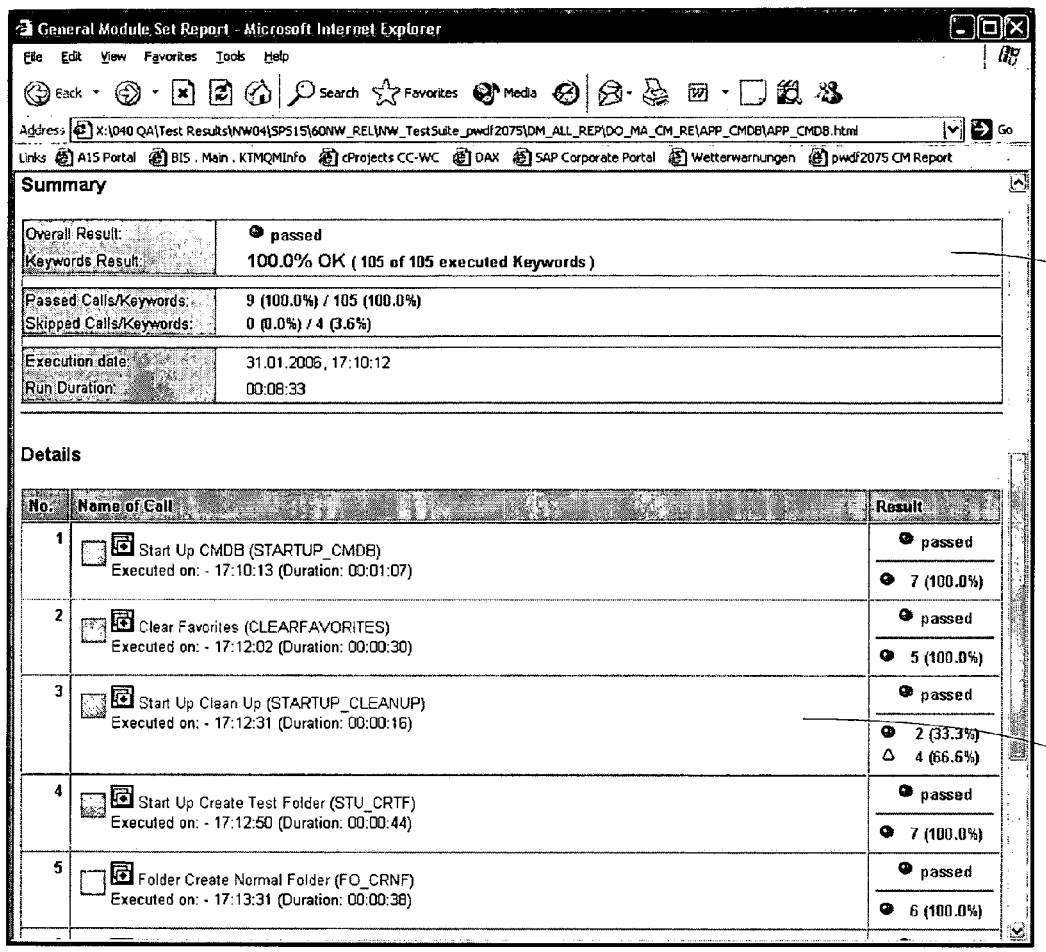
FIG. 7 illustrates a test process report embodied as a markup language file.

FIG. 7 is a screenshot representation of a test process report 700. In some cases, the test process report is assembled as an HTML page and deliverable from a server over the Internet. The test process report 700 provides a summary 702 of the executed test cases (i.e. calls), as well as statistics related to the associated application modules. The test process report 700 further includes a detailed explanation 704 of each executed test case. FIG. 8 is a screenshot representation of a test case report 800. The test case report 800 includes a description 802 of each function call, and a result 804 of the execution of each of the described function calls.

The test tool described above is preferably a java application residing on the local system, requiring a Jave Runtime Environment (JRE) installed on this system. The JRE is a subset of the Java Development Kit (JDK) that contains the core executables and files that constitute the standard Java platform. The JRE includes the Java Virtual Machine (JVM), core classes, and supporting files. Additionally, the third party test tool (WinRunner or TestPartner) has to be installed on the local system. Any of the used test tools are executed on the client machine.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
providing, in connection with the testing of one or more applications, a function library comprising a plurality of functions and at least one tracking mechanism, each function associated with a user-activatable control element of a graphical user interface and corresponding to a single user action of the control element, each function further being independent of any process logic of the graphical user interface such that the function is used independently of any related graphical user interface objects, the graphical user interface forming part of a dynamic application in which a corresponding user interface is dynamically created depending on user interaction with the graphical user interface;
assembling a test case of a plurality of test cases that comprises two or more functions from the plurality of functions in a desired order with requisite parameter values; and
executing, independent of operation of the dynamic application, one or more user actions corresponding to the two or more functions of the test case, each function configured for use independently of a related user interface object within the graphical user interface, the execution of the one or more user actions being tracked by using the at least one tracking mechanism.

2. A method in accordance with claim 1, further comprising formatting the test case as an extended markup language file.

3. A method in accordance with claim 1, further comprising combining one or more test cases of the plurality of test cases to form a test process.

4. A method in accordance with claim 3, further comprising formatting the test process as a markup language file.

5. A method in accordance with claim 3, further comprising executing the test process to test the dynamic application.

6. A method in accordance with claim 5, wherein executing the test process includes executing the one or more test cases substantially in parallel, wherein each test case associated with the test process is associated with a respective application such that the substantially parallel executing of the one or more test cases causes substantially parallel testing of each respective application.

7. A method in accordance with claim 3, wherein at least one of the one or more test cases comprises creating a folder associated with one criterion, and wherein the test process comprises creating a plurality of folders associated with a plurality of corresponding criteria that includes the one criterion.

8. A method in accordance with claim 7, wherein:
the one criterion comprises inclusion of characters from a first predetermined set of characters in the folder; and
the plurality of criteria comprises inclusion of characters from at least the first predetermined set of characters, a second predetermined set of characters, and a third predetermined set of characters.

9. A method in accordance with claim 1, further comprising modeling each user action of the application to form one of the functions.

10. A method in accordance with claim 1, wherein results of the tracking are displayed on the graphical user interface.

11. A computer program product, non-transitorily embodied in a computer readable medium, the computer program product comprising instructions operable to cause data processing apparatus to:
provide a function library having a plurality of functions to a computer, each function associated with a user-activatable control element of a graphical user interface of an application executed by the computer and corresponding to one user action of the control element, each function further being independent of any process logic of the graphical user interface such that the function is used independently of any related graphical user interface objects, the graphical user interface forming part of a dynamic application in which a corresponding user interface is dynamically created depending on user interaction with the graphical user interface;
assemble a test case comprising two or more functions from the plurality of functions in a desired order with requisite parameter values; and
execute, independent of operation of an application, one or more user actions corresponding to the two or more functions of the test case, each function configured for use independently of a related user interface object within the graphical user interface, the execution of the one or more user actions being tracked for errors by using at least one tracking mechanism included in the function library.

12. A computer program product in accordance with claim 11, further comprising instructions operable to cause data processing apparatus to format the test case as a markup language file.

13. A computer program product in accordance with claim 11, further comprising instructions operable to cause data processing apparatus to combine one or more test cases to form a test process.

14. A computer program product in accordance with claim 13, further comprising instructions operable to cause data processing apparatus to format the test process as a markup language file.

15. A computer program product in accordance with claim 13, further comprising instructions operable to cause data processing apparatus to execute the test process to test the application.

16. A computer program product in accordance with claim 15, wherein the instructions operable to cause data processing apparatus to execute the test process includes instructions operable to cause data processing apparatus to execute the one or more test cases substantially in parallel.

17. A computer program product in accordance with claim 11, further comprising instructions operable to cause data processing apparatus to model each user action of the application to form one of the functions.

18. A system comprising:
   at least one programmable processor; and
   a machine-readable medium storing instructions that, when executed by the at least one processor, cause the at least one programmable processor to perform operations comprising:
   displaying a list of test functions of a function library, each test function also being displayed with corresponding input and output information, each function associated with a user-activatable control element of a graphical user interface of an application to be tested and corresponding to a single user action of the control element, each function further being independent of any process logic of the graphical user interface such that the function is used independently of any related graphical user interface objects, the graphical user interface forming part of a dynamic application in which a corresponding user interface is dynamically created depending on user interaction with the graphical user interface;
   receiving user-generated input selected two or more of the functions;
   assembling a test case of a plurality of test cases of an application comprising the selected two or more functions, the test case assembling the two or more functions in a desired order with requisite parameter values; and
   executing, independent of operation of the application, one or more user actions corresponding to the two or more functions of the test case, the parameters of each function allowing such function to be used independently of a related graphical user interface object, the execution of the one or more user actions being tracked for errors by using at least one tracking mechanism included in the function library, wherein the execution of the one or more user actions causes substantially parallel testing of a plurality of applications.

* * * * *